ELECTRONIC ADDING DEVICES

Inventors:
F. C. Williams
T. Kilburn
D. L. H. Gibbings
Attorneys: Moore and Hall Inventors:
F. C. Williams
T. Kilburn
D. L. H. Gibbings
Attorneys: Morris and Hall INVENTORS:
F.C. WILLIAMS
T. KILBURN
D.L.H. GIBBINGS
ATTORNEYS: Morse and Hall INVENTORS:
F. C. WILLIAMS
T. KILBURN
D. L. H. GIBBINGS
ATTORNEYS:
Moore and Hall 2,784,907

ELECTRONIC ADDING DEVICES

Frederic Calland Williams, Timperley, and Tom Kilburn, Davyhulme, Manchester, England, and Dennis Lawrence Harold Gibbings, Croydon, New South Wales, Australia, assignors to National Research Development Corporation, London, England, a corporation of Great Britain Application April 30, 1952, Serial No. 285,148

Claims priority, application Great Britain May 8, 1951

22 Claims. (Cl. 235—61)

This invention relates to improvements in electronic digital computing devices and is more particularly concerned with an improved arrangement for effecting addition of binary numbers when represented by electric pulse signal trains.

In copending patent application Serial No. 105,352, now Patent No. 2,749,034, there is described an improved circuit arrangement for adding together two binary numbers, each represented simultaneously in dynamic form by electric pulse signal trains, and obtaining therefrom a further electric pulse signal train which represents, again in dynamic form, the sum of the initial binary numbers.

The present invention has for its object the provision of an arrangement which is capable of accepting simultaneously on separate input leads a considerable number of separate input pulse trains each representative in dynamic form of separate binary numbers and providing on a single output lead a further pulse signal train representative of the sum of all of the input numbers.

In an arrangement according to the invention there is first derived for each digit position of the simultaneously applied input signals, a single signal pulse whose amplitude lever represents the analogue sum of the total number of input pulses simultaneously occurring in the group of input leads, said derived sum-representing signal being then applied to each of a plurality of amplitude-discriminator circuits having different discrimination levels and providing a characteristic output signal only when such level is exceeded, such discriminator output signals being then used each to cause, in these amplitude-discriminator circuits having lower discrimination levels, the subtraction from said derived sum-representing pulse of an amount which is representative of the discrimination level of the amplitude-discriminator circuit from which the particular output signal was derived and also each to cause the effective reapplication to the means by which said first sum-representing signal was derived of an input equivalent to the same number represented by then used each to cause, in those amplitude-discriminanator circuit having the lowest discrimination level provding a pulse signal train which is representative of the binary number constituting the sum of said input numbers.

One particular arrangement according to the invention comprises means having a plurality of separate input terminals for deriving a signal pulse whose amplitude is representative of the sum of the number of "1" digit-representing signals simultaneously occurring at any instant at said input terminals, a plurality of amplitude discriminator circuits each of which is arranged to provide a characteristic output signal whenever the resultant amplitude on one or more input pulse signals simultaneously applied thereto exceeds a predetermined level, the respective predetermined discrimination levels for said circuits being of different and progressively increased amplitude values related to the ascending significance values of the binary scale of numbers, means for applying said sum-representing pulse as one input to each of said amplitude discriminator circuits, means for utilising the characteristic output signal from each of said amplitude discriminator circuits except that of the lowest discrimination level to cause simultaneous application to all of the amplitude discrimination circuits of lower discrimination levels of an input signal which is effective to subtract from the amplitude of the applied sum-representing pulse simultaneously fed to such circuits by an amount which is related to its own significance in the binary scale of numbers, further means for utilising the characteristic output signal from each one of said amplitude discriminator circuits except that of the lowest discrimination level to cause reapplication to said sum-pulse deriving means of an input representative of the binary number value of that particular amplitude discriminator circuit from which it was derived and output terminal means in said amplitude discriminator circuit of lowest discrimination level for delivering an electric signal pulse train representing the binary sum of the numbers represented by the separate pulse trains applied to said separate input terminals.

In order that the various aspects of the invention may be more readily understood certain constructional embodiments thereof will now be described with reference to the accompanying drawings in which:

Fig. 3 is a circuit diagram of one of the amplitude discriminator devices of the arrangement of Fig. 1 while

Figure 1:
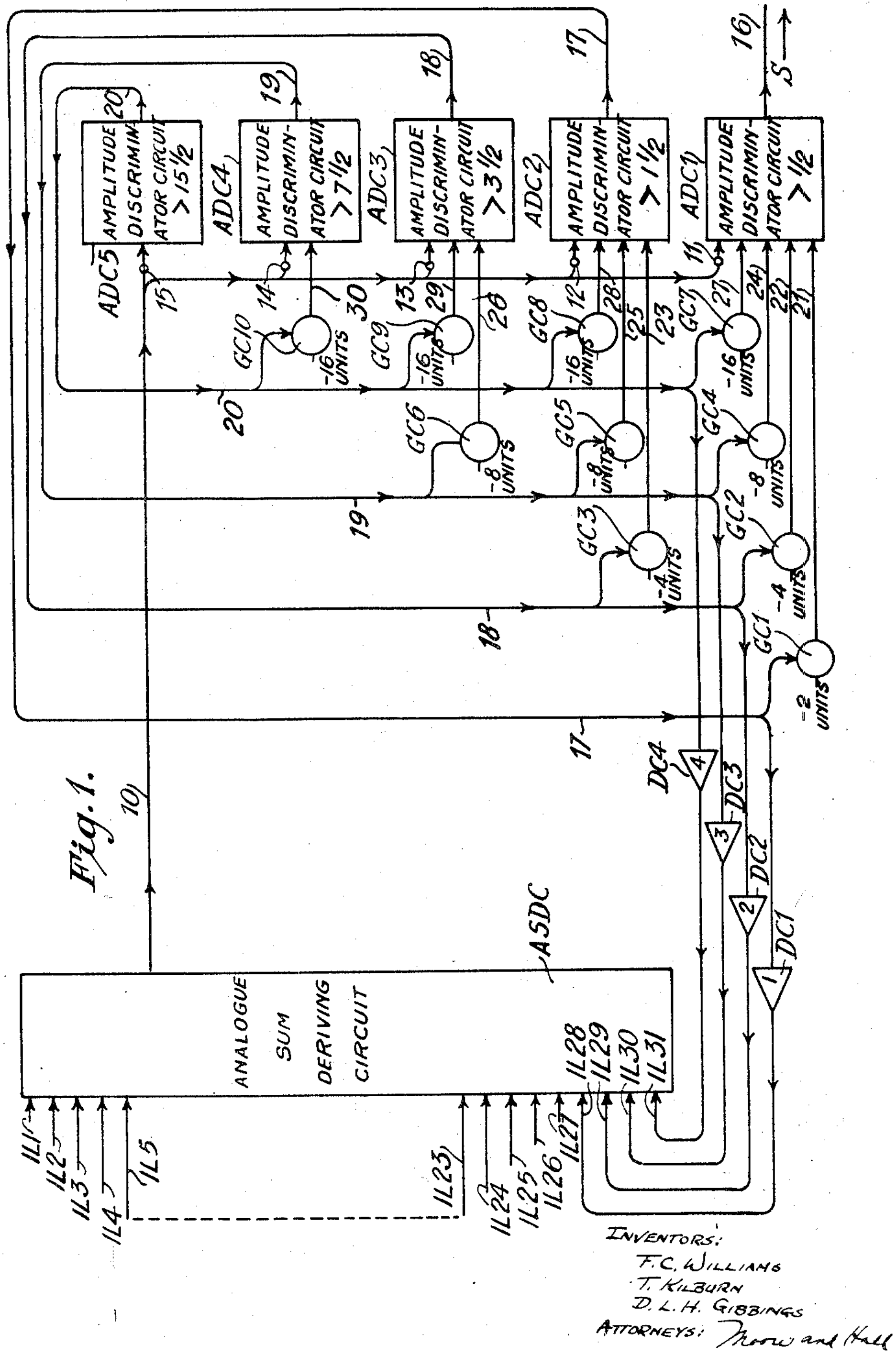
Fig. 1 is a block schematic diagram of an arrangement according to the invention for accepting up to twenty-seven separate and simultaneously occurring input pulse signal trains each representative of binary numbers which are required to be added.

The broad outline of the invention and its manner of operation will first be given with reference to Fig. 1. Referring to this figure, the various input electric pulse signal trains, each representing one of the different binary numbers which are to be added and wherein the various digit-representing signals of similar binary power significance occur simultaneously, are applied separately on the various input leads IL1, IL2 . . . IL27 to an analogue sum deriving circuit ASDC. This circuit has four additional input connections IL28 . . . IL31 whose purpose will be described later. The circuit serves to provide on its output lead 10, an output pulse whose amplitude is proportional to the total number of binary "1" representing digit signals which are present simultaneously upon the various input leads IL1 . . . IL31 regardless of what leads are active at any one time. This output pulse, which may thus have an amplitude which is variable in unit steps between zero and thirty-one times a predetermined unit amplitude, is applied as a controlling input signal to each of the input terminals 11, 12, 13, 14 and 15 respectively of five separate amplitude-discriminator circuits ADC1, ADC2, ADC3, ADC4 and ADC5.

Each of the amplitude discriminator circuits except that of ADC5 is provided with one or more additional input terminals and whose function is to allow the controlled application of potentials which operate subtractively upon the output pulse from the circuit ASDC so as to decrease its effective amplitude by a predetermined number of said unit amplitude steps. Each of the amplitude discriminator circuits ADC1 . . . ADC5 operates to provide an output pulse when, and only when, the effective amplitude of the output pulse from circuit ASDC, after any subtractions that may be made, has a value which exceeds the particular predetermined discrimination level of the circuit.

The amplitude discriminator circuit ADC1 has a discrimination level equal to one-half that of the aforesaid unit amplitude for the output pulse from the analogue sum deriving circuit ASDC while the amplitude discriminator circuit ADC2 has a discrimination level of one and a half of such amplitude units, the amplitude discriminator circuit ADC3 a discrimination level of three and a half amplitude units, the amplitude discriminator circuit ADC4 a discrimination level of seven and a half amplitude units and the amplitude discriminator circuit ADC5 a discrimination level of fifteen and a half amplitude units.

The output lead 16 from the amplitude discriminator circuit ADC1 constitutes the final output connection of the arrangement and delivers a pulse signal train representing, in dynamic serial form, the binary sum number S of the various input binary numbers applied as electric pulse signal trains to the input leads IL1 . . . IL27.

The output from the amplitude discriminator circuit ADC2 is applied over lead 17 as the controlling medium for a single control gate circuit GC1 through which a potential causing the effective subtraction of two of the aforesaid amplitude units from the value of the input pulse arriving at terminal 11 from the analogue sum deriving circuit ASDC, may be applied over lead 21 to the amplitude discriminator circuit ADC1. The same output from the amplitude discriminator circuit ADC2 on lead 17 is also fed to a delay circuit DC1 which serves to impose upon any signal applied thereto a time delay equal to one digit-interval time of the input pulse signal trains supplied to the input leads IL1 . . . IL27. The delayed signal output from this delay circuit DC1 is then fed back to the analogue sum deriving circuit ASDC as an additional input on the input lead IL28. The form of the signal supplied from the delay device DC1 is such that it constitutes the equivalent of a binary "1" representing signal occurring one digit interval later than that in which the initiating output appeared from the circuit ADC2.

The output from the amplitude discriminator circuit ADC3 is similarly applied over lead 18 to control two gate circuits GC2, GC3 which govern respectively the application to each of the amplitude discriminator circuits ADC1 and ADC2, by way of leads 22, 23, of a potential which causes the subtraction of four of the aforesaid amplitude units from the value of the input pulse arriving at terminals 11 and 12 of those circuits. The same output from the amplitude discriminator circuit ADC3 on lead 18 is also applied through a second delay circuit DC2, which imposes a time delay equal to two digit-interval time periods of the input pulse signal trains used, to the further input lead IL29 of the analogue sum deriving circuit ASDC. This signal forms the equivalent of a "1" representing signal occurring two digit intervals later than that in which the initiating signal appeared at the output from the circuit ADC3.

In similar manner the output on lead 19 from amplitude discriminator circuit ADC4 is used to control three separate gate circuits GC4, GC5 and GC6 which govern respectively the application, through leads 24, 25 and 26, of a potential which causes the effective subtraction of eight of the aforesaid amplitude units from the value of the input pulse arriving at terminals 11, 12 and 13 of the amplitude discriminator circuits ADC1, ADC2 and ADC3. The same output on lead 19 is also applied through a delay circuit DC3, which imposes a time delay equal to three digit-interval time periods of the input signal pulse trains, to the additional input lead IL30 of the analogue sum deriving circuit ASDC. This input signal forms the equivalent of a "1" representing signal occurring three digit intervals later than that in which the initiating signal appeared at the output from circuit ADC4.

The output on lead 20 from amplitude discriminator circuit ADC5 is likewise used to control four additional gate circuits GC7, GC8, GC9 and GC10 which govern respectively the application, by way of leads 27, 28, 29 and 30, of a potential which causes the effective subtraction of sixteen of the aforesaid amplitude units from the value of the input pulse arriving at the terminals 11, 12, 13 and 14 of the amplitude discriminator circuits ADC1, ADC2, ADC3 and ADC4 of lower discrimination levels. The output on lead 20 is also applied by way of further delay circuit DC4, which imposes a delay equal to four of the digit interval time periods of the input pulse signal trains, to the fourth of the additional input leads IL31 of the analogue sum deriving circuit ASDC. This input signal forms the equivalent of a "1" representing signal occurring four digit intervals later than that in which the initiating signal appeared at the output from circuit ADC5.

*Operation*

In describing the operation of the above arrangement there will be taken as an example the simultaneous occurrence, on fourteen of the twenty-seven input leads IL1 . . . IL27, of the binary equivalent of the decimal number 1, that is a single "1" digit-representing pulse at the first only of a number of successive digit intervals. One form of such a signal is shown in diagram (*a*) Fig. 6 where the binary digit "1" is signalled by the presence of a negative-going pulse during the first six microseconds of a ten-microsecond digit interval time. The binary digit "0" is signalled by the absence of such a pulse during any digit interval time.

Under these circumstances, the analogue sum deriving circuit ASDC will, during the first digit interval time *t1*, provide an output pulse on lead 10 having an amplitude value of fourteen units. This amplitude level will not pass the amplitude discriminator circuit ADC5 and in consequence the gate circuits GC7 . . . GC10 will not be opened and no delayed input pulse will be fed back to the input lead IL31 of the analogue sum deriving circuit ASDC. Such output pulse of fourteen units amplitude will, however, pass the amplitude discriminator circuit ADC4 since there is no subtraction input on the other input lead 30 to this circuit and an output signal will therefore be provided on lead 19. This signal will serve to open the gate circuits GC4, GC5 and GC6 and will also cause a pulse to be fed back to the input lead IL30 of the analogue sum deriving circuit ASDC through the delay circuit DC3 so as to arrive after a delay of three digit-interval periods, i. e. during the fourth digit interval *t4*, Fig. 6 (*a*). The opening of gate circuits GC4 . . . GC6 causes the effective subtraction of eight amplitude units from the available input to each of the remaining amplitude discriminator circuits ADC3, ADC2 and ADC1 which are of lower discrimination level.

The resultant or summation input to the amplitude discriminator circuit ADC3 will therefore be the original output on lead 10, i. e. fourteen units minus the eight unit subtraction output from gate circuit GC6, giving a resultant amplitude of six units only. This input is, however, still greater than the three and a half unit discrimination level of the circuit and there will in consequence be an output signal on lead 18 which in turn will operate to open gate circuits GC3 and GC2 and also to cause a pulse to be fed back through delay circuit DC2 to the input lead IL29 of the analogue sum deriving circuit ASDC arriving at the latter after a delay of two digit interval time periods, i. e. during interval *t3*, Fig. 6 (*a*). The opening of gate circuits GC3 and GC2 causes the effective further subtraction of four amplitude units from the available input to each of the remaining amplitude discriminator circuits ADC2 and ADC1.

The resultant or summation input to the amplitude discriminator circuit ADC2 is therefore that of the original output on lead 10, i. e. fourteen units, less the eight unit subtraction output from gate circuit GC5, less the four unit subtraction output from gate circuit GC3, giving a resultant summation level of two units only. This level again is greater than the one and a half unit discrimination level of the circuit and an output signal will be provided on lead 17 and this in turn will open the gate circuit GC1 and also cause a pulse to be fed through delay circuit DC1 to the input lead IL28 of the analogue sum deriving circuit ASDC so as to arrive at the latter in the next following digit interval, i. e. during interval time $t2$, Fig. 6 ($a$).

The opening of gate circuit GC1 causes the further subtraction of two amplitude units from the available input to the remaining amplitude discriminator circuit ADC1 so that the resultant input to the latter is the original fourteen unit amplitude signal on lead 10 less the eight unit subtraction signal from gate GC4, less the four unit subtraction signal from gate GC2 and less the two unit subtraction signal from gate GC1. The summation level to circuit ADC1 is therefore zero and in consequence during the current, i. e. the first, digit interval $t1$ of the output pulse train there will be no "1" representing output pulse signal on the output lead 16. This is indicated at $a$ in Fig. 6 ($b$).

During the next following digit interval $t2$ of the pulse trains, the input pulse signal trains on the 27 input leads IL1 . . . IL27 of the analogue sum deriving circuit ASDC themselves contain no further "1" digit representing pulse signals and the fed-back pulse arriving on input lead IL28 from the discriminator ADC2 through the delay circuit DC1 will be the only input pulse available during that digit interval. In consequence the output pulse on lead 10 will have an amplitude level of one unit only.

Figure 6:
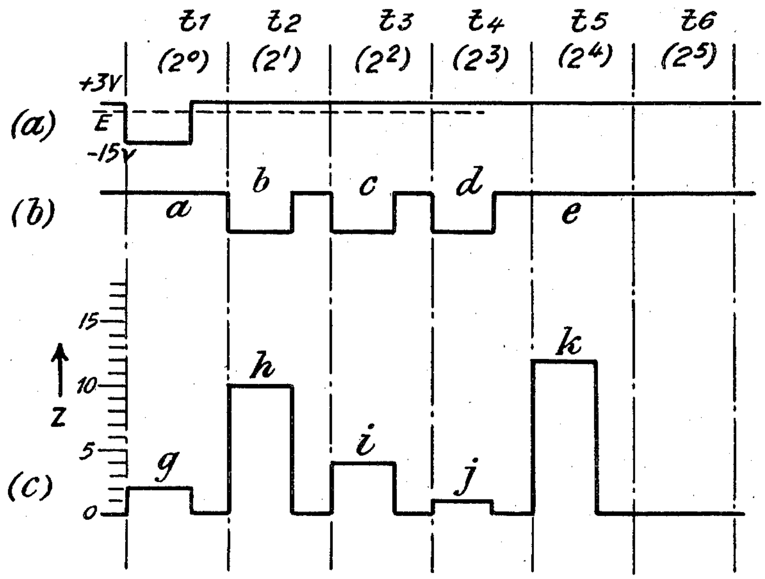
Fig. 6 is a series of explanatory waveform diagrams.

Such unit amplitude level is obviously insufficient to pass any of the amplitude discriminator circuits except that of ADC1 and as the latter will not be affected by any subtraction inputs in view of the non-opening of any of the gates GC1, GC2, GC4, GC7 such one unit signal will be greater than the one-half unit discrimination level of the circuit ADC1 and will appear as a "1" representing output pulse on the lead 16, i. e. a pulse appearing in the digit interval $t2$ as shown at $b$ in Fig. 6 ($b$).

During the next or third digit interval $t3$ of the input pulse trains the fed back pulse arriving on input lead IL29 of the analogue sum deriving circuit ASDC will again be the only pulse existing at the time on any of the input leads to circuit ASDC and the output on lead 10 will again be a pulse of single unit amplitude only. This output pulse will again be effective to pass only the amplitude discriminator circuit ADC1 to provide on lead 16 a second "1" representing output pulse during the third digit interval $t3$ of the pulse train as shown at $c$ in Fig. 6 ($b$).

In the next following digit interval $t4$, Fig. 6 ($a$), the pulse fed back from amplitude discriminator circuit ADC4 through delay circuit DC3 will arrive at the analogue sum deriving circuit ASDC on input lead IL30 and since it is again the only input pulse existing at that time there will again be a unit amplitude output pulse on the lead 10 and this will be effective only to pass the amplitude discriminator circuit ADC1 to provide a third "1" representing output pulse on lead 16 during the digit interval $t4$ as shown at $d$ in Fig. 6 ($b$).

In the next following digit-interval $t5$ there is no input on any of the leads IL1 . . . IL27 while there are no delayed inputs still to be applied and so far as the initial fourteen simultaneous input signals are concerned the adding operation will now be completed. The resultant output signal on lead 16 is therefor 0111 (reading from left to right) and it will be seen that this correctly represents the binary sum number S of the input numbers.

It will be appreciated that, had any or all of the various input signal trains on the leads IL1 . . . IL27 also contained "1" representing signals in any of the following digit intervals $t1$, $t2$ . . . $t_n$, these would automatically have taken part in the subsequent carry-over steps and the output signal would have been modified accordingly.

*Analogue sum deriving circuit ASDC*

Figure 2:
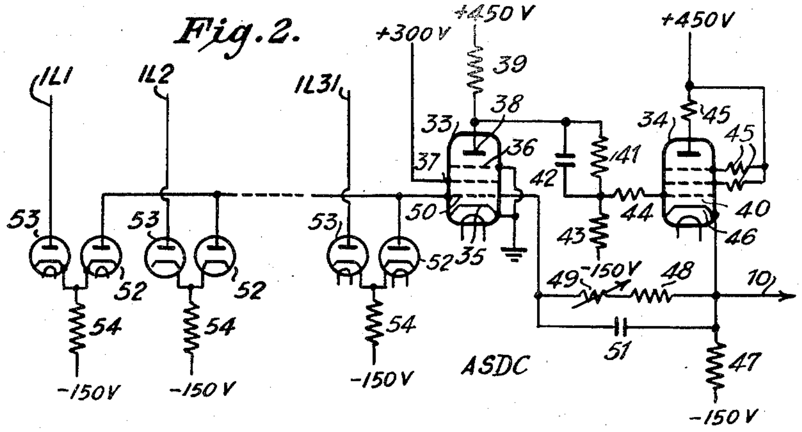
Fig. 2 is a circuit diagram of one form of analogue sum deriving device for the arrangement of Fig. 1.

Fig. 2 shows one circuit arrangement suitable for constituting the analogue sum deriving circuit ASDC of Fig. 1. This circuit arrangement, which bears some resemblance to the general form of circuit described in the aforesaid copending application No. 105,352, comprises a first thermionic valve 33 arranged in conjunction with a second thermionic valve 34 in the form of an anode follower type of feed-back circuit. The valve 33 comprises a pentode of high mutual conductance value, conveniently provided by four parallel-connected valves type EF50. The cathode 35 and suppressor grid 36 of the valve are connected to earth while the screen grid 37 is connected to a source of positive potential +300 v. The anode 38 of valve 33 is connected by way of load resistor 39 (15 kilohms) to a source of positive potential +450 v. The anode 38 is also coupled by a direct-current circuit to the control grid 40 of valve 34 such circuit including resistor 41 (220 kilohms) shunted by capacitor 42 (270 micro-microfarads). This resistor/condenser network forms part of a potentiometer chain including resistor 43 (560 kilohms) connected at its free end to a source of negative potential −150 v. The junction between resistors 41 and 43 is connected to the control grid 40 of valve 34 through grid stopper resistor 44 (100 ohms).

The valve 34, which operates as a cathode follower, is also of pentode form and conveniently comprises two parallel-connected valves, type VC173. This valve has its anode, suppressor grid and screen grid strapped together to provide a triode connection with interposed suppressing resistors 45 (each 100 ohms). This anode connection is connected directly to the source of positive potential 450 v.

The cathode 46 of valve 34 is connected by way of cathode load resistor 47 (33 kilohms) to the source of negative potential −150 v. The cathode 46 is also connected to lead 10 which constitutes the output lead of Fig. 1 while such cathode is also coupled by way of a feedback path comprising resistors 48 and 49, whose value ($r$ ohms) will be discussed later, to the control grid 50 of valve 33. The resistors 48 and 49 are conveniently shunted by capacitor 51 whose value ($c$ micro-microfarads) will also be discussed later.

The control grid 50 of valve 33 is connected to the anode of each one of thirty-one similar diodes 52 which each form one of a pair of diodes in conjunction with thirty-one similar diodes 53. The anode of each one of these other diodes 53 of each pair is connected to one or other of the various input leads IL1, IL2 . . . IL31 of Fig. 1. The cathodes of the two diodes 52, 53 of each pair are interconnected and joined to one end of a bleed resistor 54 whose value (R ohms) will be discussed later and whose opposite end is connected to the source of negative potential −150 v.

In the operation of this circuit, the various input signals on any of the input leads IL1 . . . IL27 or the further input leads IL28 . . . IL31 have a form resembling that shown in diagram ($a$) Fig. 6 whereby they normally have a resting or binary "0" representing level of, say +3 v. and whereby any binary "1" digit is represented by a square negative-going pulse of, say, −15 v. amplitude.

Each diode pair performs a switching operation and, for simplicity, one diode pair only, that associated with the input lead IL1, will first be considered. Whenever the signal potential on the input lead IL1 is in its resting condition of +3 v., the diode 53 alone is conductive since the anode of the other diode 52 which is connected to the control grid 50 of valve 33 is necessarily held at or below earth potential by reason of the earthed cathode of such valve 33 and the associated anode follower circuit. In consequence there will be a current flow to the negative source, −150 v., through the associated resistor 54 of that diode pair, of a given value of the order of $$\frac{R}{150 \text{ v.}}$$

where R is the particular resistance value assigned to the resistor 54. Whenever the input lead IL1 is supplied with a negative-going or "1" representing pulse as shown in Fig. 6 (*a*), the anode of the diode 53 will be driven negatively to −15 v. and in consequence the cathodes of the two diodes will drop in voltage to a level which is sufficient to render the other diode 52 conductive; the diode 53 connected to the input lead IL1 then becomes cut off.

In consequence of this action the previous current flow to the negative source 150 v. through the resistor 54 will now take place through the other diode 52 and will be drawn from the cathode point of valve 34 through resistors 48, 49. This is in consequence of the well known manner of the anode follower circuit wherein any tendency for the control grid of valve 33 to change in potential is resisted by the feedback connections from valve 34 and the sequence of events is substantially as follows. The connection of the particular resistor 54 to the control grid 50 of valve 33 tends to drive such control grid negatively. This in turn results in a positive swing at the anode 38 of valve 33 which accordingly tends to drive the control grid 40 of valve 34 positively with resultant increased anode current flow and a rise of potential at the cathode 46 of the valve. This provides an increase in the value of bleed current flow through resistors 48 and 49 equal to the extra current called for by the opening up of the diode 52.

The operation of each of the other diode pairs is precisely similar and as a result the potential at the cathode 46 of valve 34 moves in steps and has an amplitude N which is dependent solely upon the number of the thirty-one similar input diode pairs 52, 53, having input leads which are receiving negative "1" representing pulses at the same time. The output on lead 10 is accordingly a positive-going pulse of an amplitude which is representative of the analogue sum of the input pulses supplied to the circuit. Various representative output pulses are shown in diagram (*c*) of Fig. 6, the first pulse (*g*) being of two units amplitude, the second (*h*) of ten units amplitude, the third (*i*) of four units amplitude, the fourth (*j*) of one unit amplitude and the fifth (*k*) of twelve units amplitude.

The value, R ohms, of each of the resistors 54 will determine the current drawn from the control grid 50 for each unit input and this, in turn and in conjunction with the combined value, *r* ohms, of the resistors 48, 49, will determine the voltage step on the output lead 10 for each unit input. For ease and reliability of operation, as large an output voltage step as possible is desirable but in conflict to this is the desirability of limiting the total swing at the cathode 46 of valve 34 to a manageable amount and also to limit the current flow as much as possible in order to obtain maximum operating speed. In the particular practical embodiment being described, R is given the value of 400 kilohms and *r* a value of 15 kilohms. The variable resistor 49 is provided to facilitate the somewhat critical adjustment of the value *r* ohms. The value *c* of the capacitor 51 is determined experimentally and is such as will make the anode follower circuit critically damped. A value of 15 micro-microfarads is approximately correct.

*Amplitude discriminator circuit ADC5*

Figure 3:
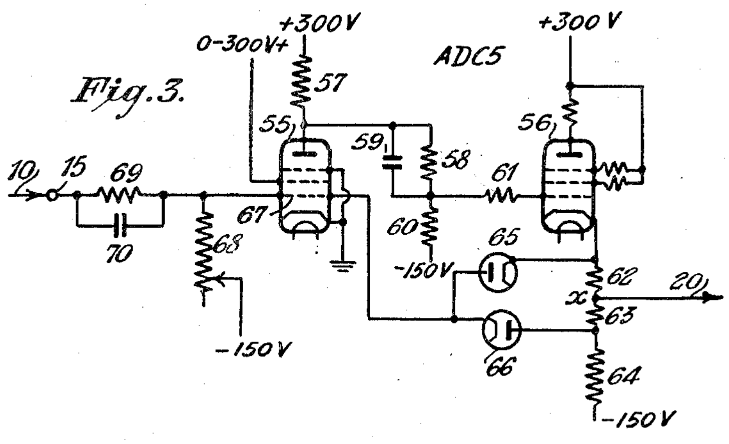

A suitable circuit arrangement for the single input amplitude discriminator circuit ADC5 of Fig. 1 is shown in Fig. 3 and comprises a first thermionic valve 55 arranged with a second thermionic valve 56 in an anode-follower type circuit. The valve 55 is a pentode, conveniently type EF50, with its cathode and suppressor grid connected directly to earth and its screen grid connected to a source of positive potential variable between 0 and 300 v. The anode of valve 55 is connected to a source of positive potential 300 v. through anode load resistor 57 (33 kilohms) and is also connected by way of a direct-current circuit to the control grid of valve 56, such circuit including a resistor 58 (150 kilohms) shunted by capacitor 59 (47 micro-microfarads). The resistor 58 forms part of a potentiometer network with resistor 60 (150 kilohms) connected at its other end to a source of negative potential −150 v. The junction of resistors 58 and 60 is connected to the control grid of valve 56 through grid stopper resistor 61 (100 ohms).

The anode, suppressor grid and screen grid of valve 56 (type CV173) are strapped together to give a triode-connection and this is connected directly to the source of positive potential 300 v. The cathode of valve 56, which is arranged as a cathode follower, is connected to a resistive load which includes two series connected resistors 62 and 63 (each 180 ohms) and a further resistance 64 (5 kilohms) connected at its free end to the source of negative potential −150 v. The cathode of valve 56 is connected to the cathode of a first diode 65 while the junction between resistors 63 and 64 is connected to the anode of a second diode 66. The anode of diode 65 and cathode of diode 66 are interconnected and coupled directly to the control grid 67 of valve 55 while the junction between resistors 62 and 63 constitutes the output connection of lead 20, Fig. 1.

The control grid 67 of valve 55 is connected to the terminal 15 (which is supplied from the lead 10 and the circuit ASDC) by way of resistance 69 shunted by capacitor 70. The control grid 67 is also connected to the source of negative potential −150 v. by way of resistor 68 whose value is conveniently adjustable for initial setting-up purposes. The resistor 69 has the value *r* ohms, i. e. 15 kilohms in the particular example while the capacitor 70 has the value *c* already discussed. The resistor 68 is required to pass a bleed current equal to fifteen and one half times that of any one of the resistors 54 of Fig. 2 and is accordingly equal to *R*/15½, i. e. 25.8 kilohms in the particular example.

In the operation of this arrangement, the anode-follower circuit connection of valves 55, 56 will cause the control grid 67 of valve 55 to remain at a substantially fixed voltage while the current flow to the grid 67 from its connection to lead 10 through resistor 69 will depend upon the voltage amplitude N of the output from the circuit ASDC. As the current flowing out through the resistor 68 to the source of negative potential −150 v. is predetermined at 15½ units, the voltage at the point *x*, i. e. the output lead 20, will tend to move either negative or positive to compensate for any excess or deficiency of the current flowing in through resistor 69 over or under that flowing through the resistor 68.

If the current flowing in through resistor 69 is exactly equal to the current flowing out through resistor 68, no current will be required to be provided or taken by the cathode circuit of valve 56 and the voltage at point *x* will be equal to that of the control grid 67. The two diodes 65, 66 will then be biased off by the space current of valve 56 flowing through the resistors 62, 63. This condition corresponds, of course, to an amplitude N of the output from the analogue-sum deriving circuit ASDC of 15½ units and is one which is only transitory in character existing during movement of the output amplitude N between 15 and 16 units or vice-versa.

If the output amplitude N is increasing above 15½ units, the resultant positive movement of the control grid 67 causes the point *x* to move negative until the upper diode 65 begins to conduct and thus to absorb the requisite compensatory current from the control grid 67. Conversely, if the output amplitude N is decreasing below 15½ units the grid 67 of valve 55 will tend to move negatively with a resultant positive movement at the point *x* whereby the lower diode 66 begins to conduct in order to supply the requisite compensatory current to the control grid 67.

In the intermediate region where both diodes 65, 67 are cut-off the feedback path of the anode-follower circuit is effectively broken and the amplifier gain from control grid 67 to the output point *x* is high. In consequence the balance is sharp. When either diode conducts the gain from control grid 67 to point *x* is abruptly reduced and the voltage at point *x* need move by only a minute amount to compensate for large changes in the input amplitude N. The output lead 20 is thus supplied with a negative-going pulse which lasts for as long as the amplitude N of the input pulse on lead 10 exceeds 15½ units. The pulse amplitude is determined by the potential drop across the resistors 62, 63.

*Amplitude discriminator circuit ADC4*

Figure 4:
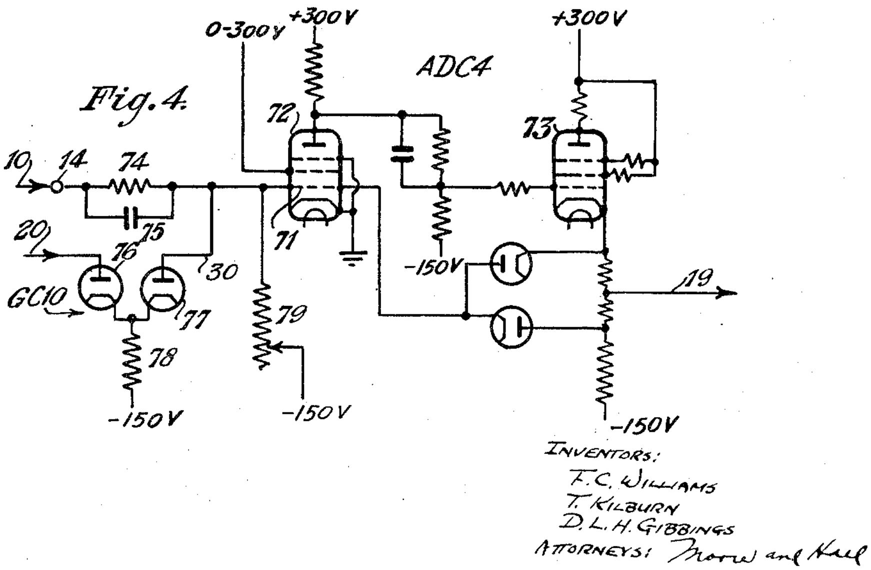
Fig. 4 is a similar circuit diagram of another of the amplitude discriminator devices of the same arrangement.

The form of the remaining amplitude discriminator circuits is very slightly different from that of the circuit ADC5 dealt with above due to the incorporation of the gate-controlled subtraction inputs. One suitable form of the two input amplitude discriminator circuit ADC4 and its associated gate circuit GC10 is shown in Fig. 4. This circuit comprises valves 72 and 73 arranged in an anode-follower type circuit exactly similar to that of valves 55, 56 of Fig. 3. The various circuit components are of identical form and value and will not, therefore, be further described.

The input terminal 14, which is supplied from the output lead 10 of the analogue sum deriving circuit ASDC, is connected to the control grid 71 of valve 72 by way of resistor 74 (*r* ohms) and the latter is shunted by damping capacitor 75 (*c* micro-microfarads). The control grid 71 is connected to the source of negative potential −150 v. by way of resistor 79 which forms the counterpart of resistor 68 of Fig. 3. As, in this particular discriminator circuit, the discrimination level is required to be equal to 7½ input amplitude units, the value of this resistor 79 is $R/7.5$, i. e. 53.3 kilohms.

The control grid 71 is also connected to the anode of a diode 77 which forms one of a pair of diodes constituting the gate circuit GC10. The other diode 76 has its anode connected to the lead 20 carrying the output from the amplitude discriminator circuit ADC5. The two cathodes of the diodes 76, 77 are interconnected and joined to a resistor 78 which is connected at its opposite end to the source of negative potential −150 v. As will be explained later, the function of this gate circuit is, effectively, to increase the amount of bleed current from the control grid 71 to the source of negative potential 150 v. by 16 input amplitude units and the value of the resistor 78 is accordingly $R/16$, i. e. 25 kilohms.

The operation of this circuit, ignoring for the moment the additional subtraction input, is substantially identical with that already described for the circuit ADC5, any change of the input voltage amplitude N on lead 10 from seven input units to eight input units or vice-versa causing an abrupt change, by a predetermined amount, of the cathode potential of valve 73 with consequent generation of a negative-going pulse on the output lead 19 during the period when the aforesaid input on lead 10 is above seven and one-half input units in amplitude. The normal resting potential on lead 20 when the amplitude discriminator circuit ADC5 is not providing an output, due to its input being below its discrimination level, is several volts positive to earth potential and as a result the diode 76 is conductive whereas the diode 77 is cut-off due to its anode being rather lower in potential than its cathode. A bleed current equal to sixteen input amplitude units accordingly flows through the resistor 78 to the source of negative potential −150 v. from the lead 20. When, however, the circuit ADC5 is operated by an input exceeding its discrimination level, the resultant negative pulse on lead 20 lowers the potential of the anode of diode 76 and the potential of the interconnected cathodes of the two diodes 76, 77 accordingly drops until diode 77 becomes conductive and diode 76 is cut-off. When this occurs the previous sixteen unit bleed current through resistor 78 is now drawn through diode 77 and is added to the seven and one-half unit bleed current already drawn from the control grid 71 by way of resistor 79. As a result the previously described change-over range, instead of being between seven and eight input units of voltage amplitude N on lead 10, is now between twenty-three and twenty-four units and an input amplitude N on lead 10 of this value is necessary before the output pulse previously described is generated at the cathode of valve 73 and made available on output lead 19. Thus, effectively, a subtraction of sixteen units from the input amplitude N has been made although such subtraction has actually been achieved by increasing the discrimination level of the circuit ADC4. Such alternative manner of effecting the requisite change is to be construed as included within the term "subtraction" where used in this connection within the present specification.

The remaining amplitude discriminator circuits ADC3 and ADC2 are generally similar to that described in connection with Fig. 4 with the addition of, in the case of circuit ADC3, one additional double diode gate circuit and in the case of circuit ADC2, two further double diode gate circuits each provided with appropriate value bleed resistors proportioned in a manner which will be self-evident from the above description.

*Amplitude discriminator circuit ADC1*

Figures 5, 7:
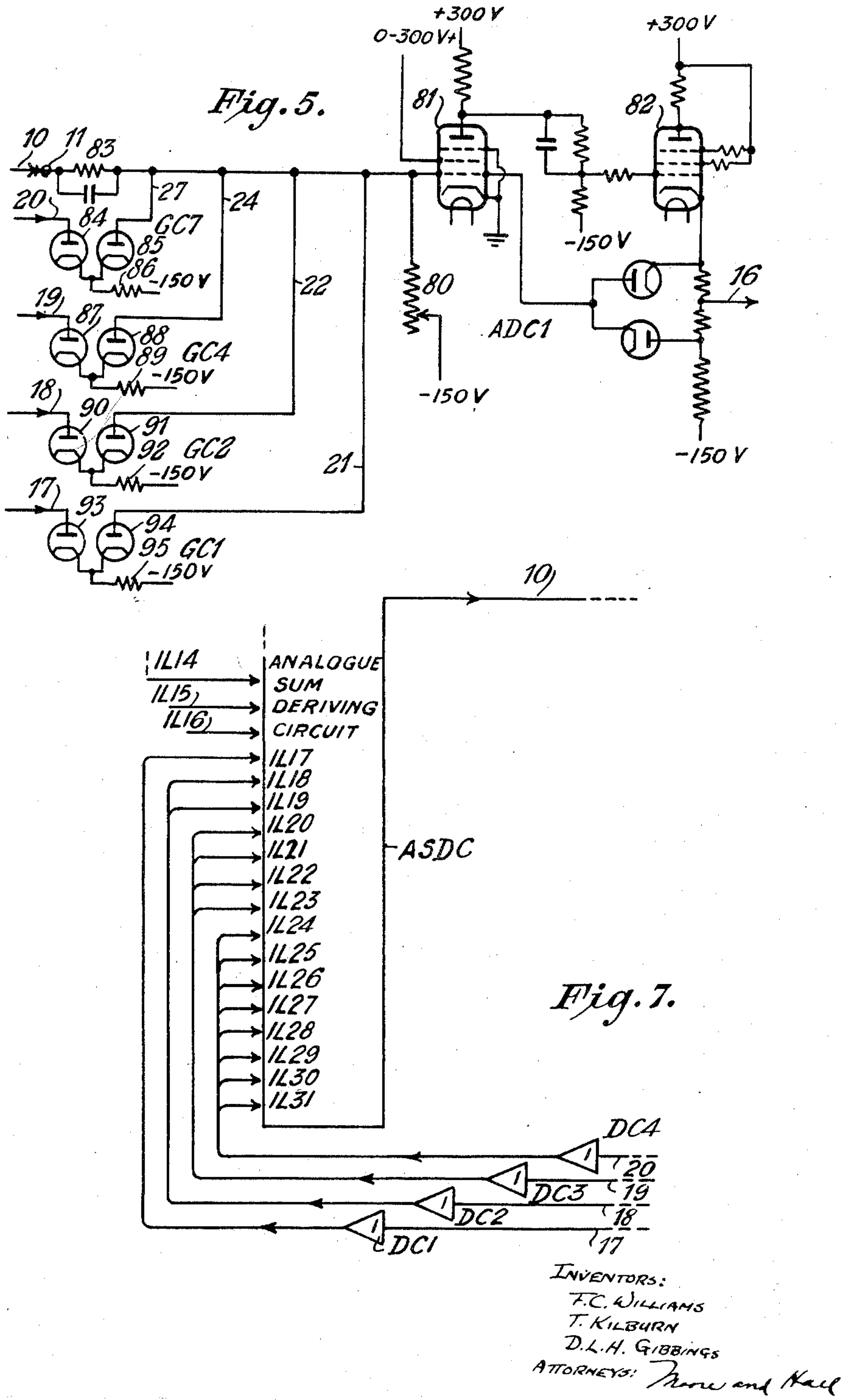
Fig. 5 is a circuit diagram of one form of the amplitude discriminator device of the arrangement of Fig. 1 which provides the sum-representing output signal.
Fig. 7 is a fragmentary view of part of Fig. 1 showing a modified arrangement.

Fig. 5 shows a suitable circuit arrangement for the final five input discriminator circuit ADC1 which provides the sum-representing output pulse train on lead 16. This circuit comprises two thermionic valves 81 and 82 arranged in an anode follower type circuit identical with that already described in connection with valves 55 and 56 of Fig. 3.

The control grid of valve 81 is connected by way of resistor 83 (*r*, 15 kilohms) to the input terminal 11 through which the output on lead 10 from the analogue sum deriving circuit ASDC is received. This resistor 83 is preferably shunted by a condenser (*c* micro-microfarads) as in the earlier circuits. The control grid of valve 81 is also connected by way of bleed resistor 80 to the source of negative potential −150 v. This resistor is required to provide a bleed current equivalent to the discrimination level of one-half input amplitude unit. Its value is accordingly $R/0.5$ or 2R, i. e. 800 kilohms.

To deal with each of the subtraction inputs already referred to, there are provided four separate pairs of diode valves 84, 85; 87, 88; 90, 91 and 93, 94. The diode pair 84, 85 constitute the gate circuit GC7. The anode of diode 84 is connected to lead 20 which is supplied with the output from the amplitude discriminator circuit ADC5 while the anode of the other diode 85 of this pair is connected to the control grid of valve 81. The cathodes of each of the diodes are interconnected and joined to a resistor 86 which is connected at its other end to the source of negative potential −150 v. This resistor is required to provide a controlled bleed current equivalent to sixteen input amplitude units and is accordingly of a value $R/16$, i. e. 25 kilohms.

In similar manner in the diode pair of 87, 88 constituting the gate circuit GC4, the anode of diode 87 is connected to lead 19 supplied with the output from the amplitude discriminator circuit ADC4 while the anode of the other diode 88 of the pair is connected to the control grid of valve 81. The cathodes of these two diodes are interconnected and joined to resistor 89 which is connected at its other end to the source of negative potential —150 v. This resistor, which is required to provide a controlled bleed current equivalent to eight input amplitude units, has a value $R/8$, i. e. 50 kilohms.

Again in similar manner, in the diode pair 90, 91 constituting the gate circuit GC2, the anode of diode 90 is connected to lead 18 supplied with the output from circuit ADC3 while the anode of the other diode 91 is connected to the control grid of valve 81. The cathodes of the two diodes are interconnected and joined by way of resistor 92 to the source of negative potential —150 v. This resistor 92 has a value of $R/4$, i. e. 100 kilohms.

In precisely similar manner in the gate circuit GC1 of diodes 93, 94 the anode of diode 93 is connected to lead 17 supplied with the output from the amplitude discriminator circuit ADC2 while the anode of the other diode 94 is connected to the control grid of valve 81. The cathodes of the two diodes are interconnected and joined by way of resistor 95 to the source of negative potential —150 v. This resistor has a value of $R/2$, i. e. 200 kilohms.

Each of the resistors 86, 89, 92 and 95 are conveniently made adjustable for ease of setting up and subsequent maintenance.

The manner of operation will be self-evident from the description already given with regard to Figs. 3 and 4. In the absence of any gate-opening potentials on the leads 20, 19, 18 and 17, only the resistor 80 is operative to provide a bleed current from the control grid of valve 81 and the change-over operation with consequent generation of a negative-going pulse on the output lead 16 will occur when the input voltage amplitude N on lead 10 varies in the range of between zero and one input unit. Whenever any one or more of the leads 17–20 are operative to open the associated gate circuit, the correspondingly increased bleed current made available to the control grid of valve 81 shifts the change-over range accordingly to provide the equivalent of a subtraction from the input signal amplitude N on lead 10.

The delay devices DC1, DC2, DC3 and DC4 can be of any suitable form, for instance, of the electrical delay line type or of the supersonic, e. g. mercury, delay line type or, more preferably, they may be of the so-called "shuffle" circuit variety as described in Fig. 3 of the aforesaid copending application.

A device of the last mentioned type provides a delay of one digit interval only but several similar devices may be arranged serially to provide arrangements suitable for constituting the delay circuits DC2, DC3 and DC4 of Fig. 1.

As an alternative to delaying of the reapplied outputs from the amplitude discriminator circuits ADC3, ADC4 and ADC5 by two, three and four digit intervals as previously described it is possible to use only one-digit period delay circuits and to make each of these feed in parallel an appropriate number of input leads on the amplitude sum-deriving circuit ASDC, provided there are a sufficient number of spare input positions available on the latter. Thus, as shown in Fig. 7, with an analogue sum-deriving circuit ASDC capable of dealing with thirty-one separate inputs, only sixteen input leads IL1–IL16 are used for supply from possible internal sources and the remaining fifteen input leads IL17–IL31 are supplied from the amplitude discriminator circuits ADC5, ADC4, ADC3, ADC2. The output from amplitude discriminator circuit ADC5, which is equivalent to the carry back of decimal value 16, is delayed by one digit period in delay circuit DC4 and then applied simultaneously to eight input leads IL24–IL31. Similarly the output from amplitude discriminator circuit ADC4, equivalent to a carry back of decimal value 8, is applied through a single digit period delay circuit DC3 to four input leads IL20 . . . IL23 in parallel while in precisely similar manner the output from amplitude discriminator circuit ADC3 is applied through a unit digit period delay circuit DC2 to two input leads IL18, IL19 in parallel while the output from the remaining amplitude discriminator circuit ADC2 is applied as before through a unit digit period delay circuit DC1 to a single input lead IL17. The operation of this arrangement will be self-evident from the description already given. Obviously instead of using a number of parallel-connected input leads of the analogue sum deriving circuit ASDC, a single input may be designed to afford the equivalent effect by suitable reduction of the value of the associated resistor 54 (Fig. 2) to one eighth, one quarter or one half of its normal value of R ohms.

An arrangement as described above has a number of obvious applications in electronic circuits dealing with binary numbers which are represented dynamically in pulse signal form while it is also capable of wider application by appropriate rearrangement of the parts and choice of component values. The number of parallel or simultaneous inputs may be varied as desired with appropriate alteration of the number of amplitude discriminator circuits and associated gate-controlled subtraction inputs and delayed feed-back signals. Thus a fifteen input analogue sum deriving circuit, affording twelve inputs for receiving external signals would feed four amplitude discriminator circuits similar to those of ADC1, ADC2, ADC3 and ADC4 just described except for the elimination of the sixteen unit subtraction input and the associated gate circuits GC7 . . . GC10 together with the delay circuit DC4. A seven input arrangement, providing for five external signals could be devised on similar lines. The number of parallel inputs which can be used is theoretically infinite but in practice the necessity of proportioning the various resistors, whose values have been dealt with in detail, in order to provide the requisite speed and reliability of operation, sets a practical limit which is of the order of 31 or, at the most, 63 simultaneous inputs when digits signalling speeds of the order of 100 kc. per second are required.

Figure 8:
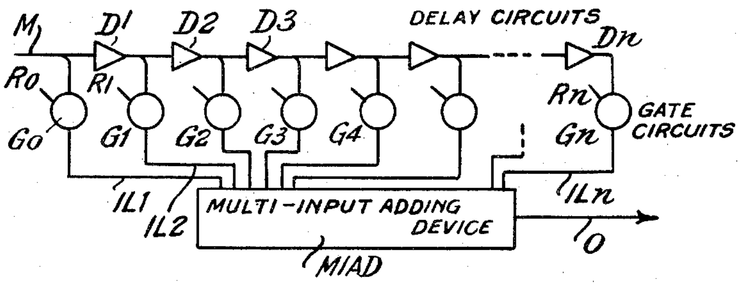
Fig. 8 is a block schematic diagram of an arrangement for multiplying binary numbers embodying the adding arrangement of the present invention.

One particular application of the invention is to use in conjunction with a binary number multiplying arrangement of the kind described in copending patent application Serial No. 132,579. This application is illustrated in block schematic form in Fig. 8 of the drawings. This particular multiplier arrangement is one in which one of the numbers to be multiplied, e. g. the multiplicand D, is fed in as a serial pulse train on lead M and passes through a series of delay devices D1, D2 . . . D$n$, each imposing a delay equal to one digit period of the pulse train. Between each delay device and before the first delay device is connected a lead passing through a gate circuit G0, G1, G2 . . . G$n$ to a separate one of the various input leads IL1 . . . IL$n$ of a multiple input adding device MIAD as described above. These gate circuits G0, G1 . . . G$n$ are arranged to be set up respectively in their open or closed states in accordance with the particular significance of the appropriate digits R0, R1 . . . R$n$ of a second number to be multiplied, e. g. the multiplier R. In the operation of the arrangement the various digits of the first number M either pass or do not pass, in accordance with the significance of the appropriate digit of the second number R, to the multiple input adding circuit MIAD in their progressively increased binary values as they emerge from the respective unit delays D1 . . . D$n$. A circuit of this kind embodying an adding arrangement according to the present invention is materially simpler than that which is obtained when other adding circuits are used in such multiplier devices.

We claim:

1. An arrangement for effecting simultaneous addition of not more than $2^n-n$ binary numbers each separately represented by simultaneously occurring electric pulse signal trains which comprises sum pulse deriving means having not more than $2^n-1$ input terminals and an output terminal, means for applying said input pulse signal trains one to each of not more than $2^n-n$ of said input terminals, said sum pulse deriving means providing at said output terminal during each digit interval of said input pulse trains a single output pulse whose amplitude is representative of the analogue sum of the total number of binary "1"-digit representing signals occurring simultaneously in said input pulse signal trains, a first amplitude discriminator circuit having an input terminal and an output terminal, circuit means for applying the output signals from said output terminal of said sum pulse deriving means to said input terminal of said first amplitude discriminator circuit, said first amplitude discriminator circuit providing an output signal at its output terminal only when the amplitude of the input signal at its input terminal is representative of at least $2^{n-1}$ simultaneous "1"-digit representing signals in said input pulse trains, $n-1$ further amplitude discriminator circuits each having an input terminal and an output terminal, circuit means for applying the output signals from said output terminal of said sum pulse deriving means to each of said input terminals of said further amplitude discriminator circuits, each of said further amplitude discriminator circuits having signal controlled amplitude reducing means for reducing the effective amplitude of the input signals applied to its input terminal by a predetermined amount, the first of said further amplitude discriminator circuits having a single amplitude reducing control terminal effective, when energised, to reduce the amplitude of the signal at its input terminal by an amount equal to $2^{n-1}$ "1"-digit representing signals in the input signal trains and providing an output signal at its output terminal only when the resultant amplitude of its input signal less any applied reduction is representative of at least $2^{n-2}$ simultaneous "1"-digit representing signals, the second of said further amplitude discriminator circuits having two amplitude reducing control terminals effective respectively, when energised, to reduce the amplitude of the signal at its input terminal by amounts equal to $2^{n-1}$ and $2^{n-2}$ "1"-digit representing signals in the input signal trains and providing an output signal at its ouput terminal only when the resultant amplitude of its input signal less any applied reduction is representative of at least $2^{n-3}$ simultaneous "1"-digit representing signals, any further of said further amplitude discriminator circuits having three, four . . . $n-1$ amplitude reducing control terminals respectively and each effective respectively to reduce the amplitude of the signal at the input terminal of such circuit by amounts equal to $2^{n-1}$, $2^{n-2}$ . . . $2^1$ simultaneous "1"-digit representing signals in the input signal trains and providing an output signal at the output terminal of such circuit only when the resultant amplitude of its input signal less any applied reduction is representative of at least $2^{n-4}$ . . . $2^0$ simultaneous "1" representing signals, $n-1$ delay devices each having input and output terminals, the first of said delay devices imposing a delay equal to $n-1$ digit intervals of the input pulse signal trains, the second of said delay devices imposing a delay equal to $n-2$ digit intervals of said input pulse signal trains and the remaining delay devices similarly imposing delays equal respectively to $n-3$ . . . 1 digit interval of said input pulse signal trains, circuit means connecting the output terminals of each of said delay devices to separate ones of the further $n-1$ input terminals of said sum pulse deriving means, circuit means connecting the output of said first amplitude discriminator circuit to the input terminal of said first delay device and to each of the amplitude reducing control terminals of the further amplitude discriminator circuits which are effective to reduce the signal amplitude of such circuits by amounts equal to $2^{n-1}$ "1"-digit representing signals, circuit means connecting the output terminal of said first of said further amplitude discriminator circuits to the input terminal of said second delay device and also to each of the amplitude reducing control terminals of said further amplitude discriminator circuits which are effective to reduce the signal amplitude by $2^{n-2}$ "1"-digit representing signals and similar further circuit means connecting the outputs of the remaining further amplitude discriminator circuits except that having an amplitude discrimination equal to one ($2^0$) "1"-digit representing signal to the remaining delay devices in order and also to the amplitude reducing control terminals of such further amplitude discriminator circuits which are effective respectively to reduce the amplitude of the input signal by $2^{n-3}$ . . . $2^1$ "1"-digit representing signals, the output terminal of said further amplitude discriminator circuit having an amplitude discrimination level of one ($2^0$) "1"-digit representing signal providing an output signal representing in serial pulse train form similar to the input pulse signal trains, the binary sum of the numbers simultaneously represented by such input pulse signal trains.

2. An arrangement for effecting addition of a plurality of binary numbers each represented in serial form by simultaneously occurring electric pulse signal trains which comprises sum pulse deriving means having a plurality of separate input terminals for connection one to each of the sources of simultaneously occurring input signal trains and an output terminal at which is provided a signal pulse whose amplitude is representative of the analogue sum of the number of "1"-digit representing signals occurring simultaneously at said input terminals, a plurality of amplitude discriminator circuits each having an input terminal and an output terminal and providing an output signal pulse at said output terminal only when the resultant amplitude of the input signal applied thereto exceeds a predetermined discrimination level, the respective discrimination levels of said amplitude discriminator circuits being different and of progressively decreased values related to the different binary power values $2^n$, $2^{n-1}$ . . . $2^1$, $2^0$, each of said amplitude discriminator circuits except the first which has the highest amplitude ($2^n$) discrimination level including amplitude subtracting means having control signal terminals and controlled by signals applied to such control signal terminals for reducing the effective amplitude of an input signal pulse applied to its input terminal from said sum pulse deriving means by amounts related to the different binary power values of amplitude discriminator circuits of higher discrimination level than itself, a plurality of delay devices each having input and output terminals and each having successively greater delay times equal to different integral numbers of the digit interval times of the applied pulse signal trains, circuit means connecting the output terminal of said sum pulse deriving means to the input terminal of each of said amplitude discriminator circuits in parallel, circuit means connecting the output terminal of said amplitude discriminator circuit of highest ($2^n$) discrimination level to the input terminal of said delay means of highest delay time and to control signal terminals of the amplitude subtracting means of said amplitude discriminator circuits of lower discrimination level to control subtraction therein of an amplitude determined by the discrimination level of said first discriminator circuit, similar circuit means connecting the output terminal of the amplitude discriminator circuit of next lower ($2^{n-1}$) discrimination level to the input terminal of said delay means of next lower delay time and to control signal terminals of the amplitude subtracting means of said amplitude discriminator circuits of lower discrimination level than itself to control the subtraction therein of an amplitude determined by the amplitude discrimination level of said second amplitude discriminator circuit and further similar circuit means connecting the output terminals of each of said further amplitude discriminator circuits of lower discrimination levels except that of the lowest ($2^0$) discrimination level to the input terminals of said other delay means and to the control signal terminals of the amplitude subtracting means of the amplitude discriminator circuits of lower discrimination levels, circuit means connecting the output terminals of each of said delay means to separate input terminals of said sum pulse deriving means and an output connection from the output terminal of said amplitude discriminator circuit of lowest ($2^0$) discrimination level for providing a pulse signal train representative of the binary sum of the numbers represented by the pulse signal trains applied simultaneously to the said separate input terminals of said sum pulse deriving means.

3. An arrangement according to claim 2 wherein said amplitude discriminator circuits each comprise a thermionic valve circuit of the anode follower type, means for causing a flow of bleed current to or from the input of said circuit which is variable in accordance with the amplitude of the applied sum-representing pulse and further means for providing a flow of bleed current from or to said input of said circuit which is constant and which is predetermined in accordance with the required discrimination level.

4. An arrangement according to claim 3 wherein those amplitude discriminator circuits which are required to modify the effective amplitude of the input sum-representing pulse are provided with current altering means, controlled by the output signal of another amplitude discriminator circuit, for adding to the value of said constant and predetermined value of bleed current from or to said input of said anode-follower circuit.

5. An arrangement according to claim 4 wherein the anode-follower type circuit includes a cathode follower final stage and a feedback circuit between the cathode output circuit of such final stage and the control grid of the first input stage which includes parallel paths through two mutually reversed polarity diodes connected to spaced tapping points on the cathode load impedance of such final stage.

6. An arrangement according to claim 5 in which the output connection from such amplitude discriminator circuit is taken from the mid point of that portion of the cathode load impedance lying between said tapping points.

7. An arrangement according to claim 2 wherein said sum pulse deriving means comprises a thermionic valve circuit of the anode follower type and a plurality of switching means each controlled by one of said input pulse trains and a source of bleed current, said switching means each controlling the flow of a predetermined unit of bleed current in the input circuit of said anode follower circuit.

8. An arrangement according to claim 7 wherein each of said switching means comprises a pair of diodes arranged in an "and" type gate circuit and a resistor of predetermined value in series with said gate circuit between the input control grid of the first valve of said anode follower circuit and the negative terminal of said source of bleed current.

9. A circuit arrangement for generating an output potential whose amplitude value is directly proportional to the number of a plurality of separate input leads which are supplied with a chosen energising potential at any one instant which comprises an anode follower type circuit including a first input amplifier valve and a second cathode follower ouput valve D. C. coupled together and a feed back path including a series resistance between the cathode of said second valve and the control grid of said first valve, a plurality of input gate devices controlled respectively by the energising potential on a different one of said input leads, a plurality of bleed resistances of predetermined value, a source of potential which is different from that of the cathode of said first valve, and circuit means for connecting each of said gate devices in series with a different one of said bleed resistances between said control grid of said first valve and said source of potential whereby the number of said bleed resistances which are connected in parallel between said control grid of said first valve and said source of potential at any one instant is determined by the number of said input leads which are supplied with energising potential at that instant.

10. A circuit arrangement for providing a signal indication whether a variable input potential is above or below a predetermined discrimination level which comprises an anode follower type thermionic valve circuit including an input amplifier valve and a D. C. coupled cathode follower output valve having a cathode load resistance and a current feedback path between the cathode circuit of said output valve and the control grid of said input valve, a resistance between the source of said variable input potential and the control grid of said input valve to provide a variable value bleed current to or from said control grid, a second resistance connected between said control grid and a source of potential of polarity, relative to said control grid, which is opposite to that of said variable input potential, said second resistance being of a value predetermined in accordance with the required discrimination level to provide a constant value of bleed current from or to said control grid and said current feedback path including parallel but mutually reversed polarity diodes respectively connected to spaced tapping points on said cathode load of said cathode follower valve whereby the cathode potential of such cathode follower valve undergoes an abrupt change whenever the bleed current due to said input potential becomes either greater than or less than said constant value bleed current.

11. An arrangement for effecting simultaneous addition of not more than five binary numbers each separately represented by simultaneously occurring electric pulse signal trains, which comprises sum pulse deriving means having not more than seven input terminals and an output terminal, means for applying said input pulse signal trains one to each of not more than five of said input terminals, said output terminal of said sum pulse deriving means providing during each digit interval of the simultaneously applied input pulse signal trains a single output signal pulse whose amplitude is representative of the analogue sum of the total number of binary "1" digit-representing signals occurring simultaneously in said input pulse signal trains, a first amplitude discriminator circuit having an input terminal and an output terminal, circuit means for supplying signal output from the output terminal of said sum pulse deriving means to said input terminal of said first amplitude discriminator circuit, said first amplitude discriminator circuit providing an output pulse signal at its output pulse terminal only when the amplitude of the signal at its input terminal is at least equal to that representative of four simultaneous "1" digit-representing signals in said input signal trains, a second amplitude discriminator circuit having an input terminal and an output terminal, circuit means for supplying the output signal from the output terminal of said sum pulse deriving means to said input terminal of said second amplitude discriminator circuit, first signal controlled amplitude reducing means connected to said second amplitude discriminator circuit and having a first control signal terminal which, when energised, causes the effective amplitude of the input signal applied to said input terminal of said second amplitude discriminator circuit to be reduced by an amount representative of four "1" digit-representing input signals, said second amplitude discriminator circuit providing an output pulse at its output terminal only when the resultant amplitude of the signal at its input terminal after any reduction is at least equal to that representative of two "1" digit-representing signals, a third amplitude discriminator circuit having an input terminal and an output terminal, circuit means for supplying the output signal from the output terminal of said sum pulse deriving means to said input terminal of said third amplitude discriminator circuit, second and third signal controlled amplitude reducing means each connected to said third amplitude discriminator circuit, said second amplitude reducing means having a second control signal terminal which, when energised, causes the effective amplitude of the input signal applied to said input terminal of said third amplitude discriminator circuit to be reduced by an amount representative of four "1" digit-representing input signals, said third amplitude reducing means having a third control signal terminal which, when energised, causes the effective amplitude of the input signal applied to said input terminal of said third amplitude discriminator circuit to be reduced by an amount representative of two "1" digit-representing input signals, said third amplitude discriminator circuit providing an output pulse at its output terminal only when the resultant amplitude of the signal at its input terminal after any reduction is at least equal to that representative of one "1" digit-representing input signal, first and second delay devices each having input and output terminals, circuit means for supplying the signal output from the output terminal of said first amplitude discriminator circuit to said first and second control signal terminals and to said input terminal of said first delay device, circuit means for supplying the signal output from the output terminal of said second amplitude discriminator circuit to said third control signal terminal and to said input terminal of said second delay device, circuit means for supplying the signal output from the output terminal of said first delay device to at least one unused input terminal of said sum pulse deriving means and circuit means for supplying the signal output from the output terminal of said second delay device to another unused input terminal of said sum pulse deriving means, said output terminal of said third amplitude discrminator circuit providing an output pulse signal train which is representative of the sum of the binary numbers represented by the simultaneously occurring input pulse signal trains.

12. An arrangement for effecting simultaneous addition of not more than five binary numbers each separately represented by simultaneously occurring electric pulse signal trans, which comprises sum pulse deriving means having not more than seven input terminals and an output terminal, means for applying said input pulse signal trains one to each of not more than five of said input terminals, said output terminal of said sum pulse deriving means providing during each digit interval of the simultaneously applied input pulse signal trains a single output signal pulse whose amplitude is representative of the analogue sum of the total number of binary "1" digit-representing signals occurring simultaneously in said input pulse signal trains, a first amplitude discriminator circuit having an input terminal and an output terminal, circuit means for supplying signal output from the output terminal of said sum pulse deriving means to said input terminal of said first amplitde discriminator circuit, said first amplitude discriminator circuit providing an output pulse signal at its output pulse terminal only when the amplitude of the signal at its input terminal is at least equal to that representative of four simultaneous "1" digit-representing signals in said input signal trains, a second amplitude discriminator circuit having an input terminal and an output terminal, circuit means for supplying the output signal from the output terminal of said sum pulse deriving means to said input terminal of said second amplitude discriminator circuit, first signal controlled amplitude reducing means connected to said second amplitude discriminator circuit and having a first control signal terminal which, when energised, causes the effective amplitude of the input signal applied to said input terminal of said second amplitude discriminator circuit to be reduced by an amount representative of four "1" digit-representing input signals, said second amplitude discriminator circuit providing an output pulse at its output terminal only when the resultant amplitude of the signal at its input terminal after any reduction is at least equal to that representative of two "1" digit-representing signals, a third amplitude discriminator circuit having an input terminal and an output terminal, circuit means for supplying the output signal from the output terminal of said sum pulse deriving means to said input terminal of said third amplitude discriminator circuit, second and third signal controlled amplitude reducing means each connected to said third amplitude discriminator circuit, said second amplitude reducing means having a second control signal terminal which, when energised, causes the effective amplitude of the input signal applied to said input terminal of said third amplitude discriminator circuit to be reduced by an amount representative of four "1" digit-representing input signals, said third amplitude reducing means having a third control signal terminal which, when energised, causes the effective amplitude of the input signal applied to said input terminal of said third amplitude discriminator circuit to be reduced by an amount representative of two "1" digit-representing input signals, said third amplitude discriminator circuit providing an output pulse at its output terminal only when the resultant amplitude of the signal at its input terminal after any reduction is at least equal to that representative of one "1" digit-representing input signal, a first delay device having input and output terminals and imposing a delay time of signals fed thereto equal to two digit-interval time periods of said input pulse signal trains, a second delay device having input and output terminals and imposing a delay time of signals fed thereto equal to one digit-interval time period of said input pulse signal trains, circuit means for supplying the signal output from the output terminal of said first amplitude discriminator circuit to said first and second control signal terminals and to said input terminal of said first delay device, circuit means for supplying the signal output from the output terminal of said second amplitude discriminator circuit to said third control signal terminal and to said input terminal of said second delay device, circuit means for supplying the signal output from the output terminal of said first delay device to an unused input terminal of said sum pulse deriving means and circuit means for supplying the signal output from the output terminal of said second delay device to another unused input terminal of said sum pulse deriving means, said output terminal of said third amplitude discriminator circuit providing an output pulse signal train which is representative of the sum of the binary numbers represented by the simultaneously occurring input pulse signal trains.

13. An arrangement for effecting simultaneous addition of not more than four binary numbers each separately represented by simultaneously occurring electric pulse signal trains, which comprises sum pulse deriving means having not more than seven input terminals and an output terminal, means for applying said input pulse signal trains one to each of not more than four of said input terminals, said output terminal of said sum pulse deriving means providing during each digit interval of the simultaneously applied input pulse signal trains a single output signal pulse whose amplitude is representative of the analogue sum of the total number of binary "1" digit-representing signals occurring simultaneously in said input pulse signal trains, a first amplitude discriminator circuit having an input terminal and an output terminal, circuit means for supplying signal output from the output terminal of said sum pulse deriving means to said input terminal of said first amplitude discriminator circuit, said first amplitude discriminator circuit providing an output pulse signal at its output pulse terminal only when the amplitude of the signal at its input terminal is at least equal to that representative of four simultaneous "1" digit-representing signals in said input signal trains, a second amplitude discriminator circuit having an input terminal and an output terminal, circuit means for supplying the output signal from the output terminal of said sum pulse deriving means to said input terminal of said second amplitude discriminator circuit, first signal controlled amplitude reducing means connected to said second amplitude discriminator circuit and having a first control signal terminal which, when energised, causes the effective amplitude of the input signal applied to said input terminal of said second amplitude discriminator circuit to be reduced by an amount representative of four "1" digit-representing input signals, said second amplitude discriminator circuit providing an output pulse at its output terminal only when the resultant amplitude of the signal at its input terminal after any reduction is at least equal to that representative of two "1" digit-representing signals, a third amplitude discriminator circuit having an input terminal and an output terminal, circuit means for supplying the output signal from the output terminal of said sum pulse deriving means to said input terminal of said third amplitude discriminator circuit, second and third signal controlled amplitude reducing means each connected to said third amplitude discriminator circuit, said second amplitude reducing means having a second control signal terminal which, when energised, causes the effective amplitude of the input signal applied to said input terminal of said third amplitude discriminator circuit to be reduced by an amount representative of four "1" digit-representing input signals, said third amplitude reducing means having a third control signal terminal which, when energised, causes the effective amplitude of the input signal applied to said input terminal of said third amplitude discriminator circuit to be reduced by an amount representative of two "1" digit-representing input signals, said third amplitude discriminator circuit providing an output pulse at its output terminal only when the resultant amplitude of the signal at its input terminal after any reduction is at least equal to that representative of one "1" digit-representing input signal, first and second delay devices each having input and output terminals and each imposing a delay time of signals fed thereto equal to one digit interval time period of said input pulse signal trains, circuit means for supplying the signal output from the output terminal of said first amplitude discriminator circuit to said first and second control signal terminals and to said input terminal of said first delay device, circuit means for supplying the signal output from the output terminal of said second amplitude discriminator circuit to said third control signal terminal and to said input terminal of said second delay device, circuit means for supplying the signal output from the output terminal of said first delay device to two unused input terminals of said sum pulse deriving means and circuit means for supplying the signal output from the output terminal of said second delay device to another unused input terminal of said sum pulse deriving means, said output terminal of said third amplitude discriminator circuit providing an output pulse signal train which is representative of the sum of the binary numbers represented by the simultaneously occurring input pulse signal trains.

14. An arrangement for effecting simultaneous addition of not more than twelve binary numbers each separately represented by simultaneously occurring electric pulse signal trains, which comprises sum pulse deriving means having not more than fifteen input terminals and an output terminal, means for applying said input trains one to each of not more than twelve of said input terminals, said output terminal of said sum pulse deriving means providing during each digit interval of the simultaneously applied input pulse signal trains a single output signal pulse whose amplitude is representative of the analogue sum of the total number of binary "1" digit-representing signals occurring simultaneously in said input pulse signal trains, a first amplitude discriminator circuit having an input terminal and an output terminal, circuit means for supplying the signal output from the output terminal of said sum pulse deriving means to said input terminal of said first amplitude discriminator circuit, said first amplitude discriminator circuit providing an output pulse signal at its output terminal only when the amplitude of the signal at its input terminal is at least equal to that representative of eight "1" digit-representing input signals, a second amplitude discriminator circuit having an input terminal and an output terminal, circuit means for supplying the output signal from the output terminal of said sum pulse deriving means to said input terminal of said second amplitude discriminator circuit, first signal controlled amplitude reducing means connected to said second amplitude discriminator circuit and having a first controlled signal terminal which, when energised, causes the effective amplitude of the input signal applied to said input terminal of said second amplitude discriminator circuit to be reduced by an amount representative of eight "1" digit-representing input signals, said second amplitude discriminator circuit providing an output pulse at its output terminal only when the resultant amplitude of the signal at its input terminal after any applied reduction is at least equal to that representative of four "1" digit-representing input signals, a third amplitude discriminator circuit having an input terminal and an output terminal, circuit means for supplying the output signal from the output terminal of said sum pulse deriving means to said input terminal of said second amplitude discriminator circuit, second and third signal controlled amplitude reducing means connected to said third amplitude discriminator circuit, said second amplitude reducing means having a second control signal terminal which, when energised, causes the effective amplitude of the input signal applied to said input terminal of said third amplitude discriminator circuit to be reduced by an amount representative of eight "1" digit-representing input signals, said third amplitude reducing means having a third control signal terminal which, when energised, causes the effective amplitude of the input signal applied to said input terminal of said third amplitude discriminator circuit to be reduced by an amount representative of four "1" digit-representing input signals, said third amplitude discriminator circuit providing an output pulse at its output terminal only when the resultant amplitude of the signal at its input terminal after any reduction is at least equal to that representative of two "1" digit-representing input signals, a fourth amplitude discriminator circuit having an input terminal and an output terminal, circuit means for supplying the output signal from the output terminal of said sum pulse deriving means to said input terminal of said fourth amplitude discriminator circuit, fourth, fifth and sixth signal controlled amplitude reducing means connected to said fourth amplitude discriminator circuit, said fourth amplitude reducing means having a fourth control signal terminal which, when energised, causes the effective amplitude of the input signal applied to said input terminal of said fourth amplitude discriminator circuit to be reduced by an amount representative of eight "1" digit-representing input signals, said fifth amplitude reducing means having a fifth control signal terminal, which when energised, causes the effective amplitude of the input signal applied to said input terminal of said fourth amplitude discriminator circuit to be reduced by an amount representative of four "1" digit-representing input signals and said sixth amplitude reducing means having a sixth control signal terminal which, when energised, causes the effective amplitude of the input signal applied to said input terminal of said fourth amplitude discriminator circuit to be reduced by an amount representative of two "1" digit-representing input signals, said fourth amplitude discriminator circuit providing an output pulse at its output terminal only when the resultant amplitude of the signal at its input terminal after any reduction is at least equal to that representative of one "1" digit-representing input signal, first, second and third delay devices each having input and output terminals, circuit means for supplying the signal output from the output terminal of said first amplitude discriminator circuit to said first, second and fourth control signal terminals and to said input terminal of said first delay device, circuit means for supplying the signal output from the output terminal of said second amplitude discriminator circuit to said third and fifth control signal terminals and to said input terminal of said second delay device, circuit means for supplying the signal output from the output terminal of said third amplitude discriminator circuit to said sixth control signal terminal and to said input terminal of said third delay device and circuit means for supplying the output signals from the output terminals of each of said delay devices to unused input terminals of said pulse amplitude adding means, said output terminal of said fourth amplitude discriminator circuit providing an output pulse signal train which is representative of the sum of the binary numbers represented by said simultaneously occurring input pulse signal trains.

15. An arrangement for effecting simultaneous addition of not more than twelve binary numbers each separately represented by simultaneously occurring electric pulse signal trains, which comprises sum pulse deriving means having not more than fifteen input terminals and an output terminal, means for applying said input trains one to each of not more than twelve of said input terminals, said output terminal of said sum pulse deriving means providing during each digit interval of the simultaneously applied input pulse signal trains a single output signal pulse whose amplitude is representative of the analogue sum of the total number of binary "1" digit-representing signals occurring simultaneously in said input pulse signal trains, a first amplitude discriminator circuit having an input terminal and an output terminal, circuit means for supplying the signal output from the output terminal of said sum pulse deriving means to said input terminal of said first amplitude discriminator circuit, said first amplitude discriminator circuit providing an output pulse signal at its output terminal only when the amplitude of the signal at its input terminal is at least equal to that representative of eight "1" digit-representing input signals, a second amplitude discriminator circuit having an input terminal and an output terminal, circuit means for supplying the output signal from the output terminal of said sum pulse deriving means to said input terminal of said second amplitude discriminator circuit, first signal controlled amplitude reducing means connected to said second amplitude discriminator circuit and having a first controlled signal terminal which, when energised, causes the effective amplitude of the input signal applied to said input terminal of said second amplitude discriminator circuit to be reduced by an amount representative of eight "1" digit-representing input signals, said second amplitude discriminator circuit providing an output pulse at its output terminal only when the resultant amplitude of the signal at its input terminal after any applied reduction is at least equal to that representative of four "1" digit-representing input signals, a third amplitude discriminator circuit having an input terminal and an output terminal, circuit means for supplying the output signal from the output terminal of said sum pulse deriving means to said input terminal of said second amplitude discriminator circuit, second and third signal controlled amplitude reducing means connected to said third amplitude discriminator circuit, said second amplitude reducing means having a second control signal terminal which, when energised, causes the effective amplitude of the input signal applied to said input terminal of said third amplitude discriminator circuit to be reduced by an amount representative of eight "1" digit-representing input signals, said third amplitude reducing means having a third control signal terminal which, when energised, causes the effective amplitude of the input signal applied to said input terminal of said third amplitude discriminator circuit to be reduced by an amount representative of four "1" digit-representing input signals, said third amplitude discriminator circuit providing an output pulse at its output terminal only when the resultant amplitude of the signal at its input terminal after any rduction is at least equal to that representative of two "1" digit-representing input signals, a fourth amplitude discriminator circuit having an input terminal and an output terminal, circuit means for supplying the output signal from the output terminal of said sum pulse deriving means to said input terminal of said fourth amplitude discriminator circuit, fourth, fifth and sixth signal controlled amplitude reducing means connected to said fourth amplitude discriminator circuit, said fourth amplitude reducing means having a fourth control signal terminal which, when energised, causes the effective amplitude of the input signal applied to said input terminal of said fourth amplitude discriminator circuit to be reduced by an amount representative of eight "1" digit-representing input signals, said fifth amplitude reducing means having a fifth control signal terminal, which when energised, causes the effective amplitude of the input signal applied to said input terminal of said fourth amplitude discriminator circuit to be reduced by an amount representative of four "1" digit-representing input signals and said sixth amplitude reducing means having a sixth control signal terminal which, when energised, causes the effective amplitude of the input signal applied to said input terminal of said fourth amplitude discriminator circuit to be reduced by an amount representative of two "1" digit-representing input signals, said fourth amplitude discriminator circuit providing an output pulse at its output terminal only when the resultant amplitude of the signal at its input terminal after any reduction is at least equal to that representative of one "1" digit-representing input signal, a first delay device having input and output terminals and imposing a delay time upon signals fed thereto equal to three digit-interval time periods of said input pulse signal trains, a second delay device having input and output terminals and imposing a delay time upon signals fed thereto equal to two digit-interval time periods of said input pulse signal trains, a third delay device having input and output terminals and imposing a delay time upon signals fed thereto equal to one digit interval time of said input pulse signal trains, circuit means for supplying the signal output from the output terminal of said first amplitude discriminator circuit to said first, second and fourth control signal terminals and to said input terminal of said first delay device, circuit means for supplying the signal output from the output terminal of said second amplitude discriminator circuit to said third and fifth control signal terminals and to said input terminal of said second delay device, circuit means for supplying the signal output from the output terminal of said third amplitude discriminator circuit to said sixth control signal terminal and to said input terminal of said third delay device and circuit means for supplying the output signals from the output terminals of each of said delay devices to different unused input terminals of said sum pulse deriving means, said output terminal of said fourth amplitude discriminator circuit providing an output pulse signal train which is representative of the sum of the binary numbers represented by said simultaneously occurring input pulse signal trains.

16. An arrangement for effecting simultaneous addition of not more than eight binary numbers each separately represented by simultaneously occurring electric pulse signal trains, which comprises sum pulse deriving means having not more than fifteen input terminals and an output terminal, means for applying said input trains one to each of not more than eight of said input terminals, said output terminal of said sum pulse deriving means providing during each digit interval of the simultaneously applied input pulse signal trains a single output signal pulse whose amplitude is representative of the analogue sum of the total number of binary "1" digit-representing signals occurring simultaneously in said input pulse signal trains, a first amplitude discriminator circuit having an input terminal and an output terminal, circuit means for supplying the signal output from the output terminal of said sum pulse deriving means to said input terminal of said first amplitude discriminator circuit, said first amplitude discriminator circuit providing an output pulse signal at its output terminal only when the amplitude of the signal at its input terminal is at least equal to that representative of eight "1" digit-representing input signals, a second amplitude discriminator circuit having an input terminal and an output terminal, circuit means for supplying the output signal from the output terminal of said sum pulse deriving means to said input terminal of said second amplitude discriminator circuit, first signal controlled amplitude reducing means connected to said second amplitude discriminator circuit and having a first controlled signal terminal which, when energised, causes the effective amplitude of the input signal applied to said input terminal of said second amplitude discriminator circuit to be reduced by an amount representative of eight "1" digit-representing input signals, said second amplitude discriminator circuit providing an output pulse at its output terminal only when the resultant amplitude of the signal at its input terminal after any applied reduction is at least equal to that representative of four "1" digit-representing input signals, a third amplitude discriminator circuit having an input terminal and an output terminal, circuit means for supplying the output signal from the output terminal of said sum pulse deriving means to said input terminal of said second amplitude discriminator circuit, second and third signal controlled amplitude reducing means connected to said third amplitude discriminator circuit, said second amplitude reducing means having a second control signal terminal which, when energised, causes the effective amplitude of the input signal applied to said input terminal of said third amplitude discriminator circuit to be reduced by an amount representative of eight "1" digit-representing input signals, said third amplitude reducing means having a third control signal terminal which, when energised, causes the effective amplitude of the input signal applied to said input terminal of said third amplitude discriminator circuit to be reduced by an amount representative of four "1" digit-representing input signals, said third amplitude discriminator circuit providing an output pulse at its output terminal only when the resultant amplitude of the signal at its input terminal after any reduction is at least equal to that representative of two "1" digit-representing input signals, a fourth amplitude discriminator circuit having an input terminal and an output terminal, circuit means for supplying the output signal from the output terminal of said sum pulse deriving means to said input terminal of said fourth amplitude discriminator circuit, fourth, fifth and sixth signal controlled amplitude reducing means connected to said fourth amplitude discriminator circuit, said fourth amplitude reducing means having a fourth control signal terminal which, when energised, causes the effective amplitude of the input signal applied to said input terminal of said fourth amplitude discriminator circuit to be reduced by an amount representative of eight "1" digit-representing input signals, said fifth amplitude reducing means having a fifth control signal terminal, which when energised, causes the effective amplitude of the input signal applied to said input terminal of said fourth amplitude discriminator circuit to be reduced by an amount representative of four "1" digit-representing input signals and said sixth amplitude reducing means having a sixth control signal terminal which, when energised, causes the effective amplitude of the input signal applied to said input terminal of said fourth amplitude discriminator circuit to be reduced by an amount representative of two "1" digit-representing input signals, said fourth amplitude discriminator circuit providing an output pulse at its output terminal only when the resultant amplitude of the signal at its input terminal after any reduction is at least equal to that representative of one "1" digit-representing input signal, first, second and third delay device each having input and output terminals and each imposing a delay time upon signals fed thereto equal to one digit interval time period of said input pulse signal trains, circuit means for supplying the signal output from the output terminal of said first amplitude discriminator circuit to said first, second and fourth control signal terminals and to said input terminal of said first delay device, circuit means for supplying the signal output from the output terminal of said second amplitude discriminator circuit to said third and fifth control signal terminals and to said input terminal of said second delay device, circuit means for supplying the signal output from the output terminal of said third amplitude discriminator circuit to said sixth control signal terminal and to said input terminal of said third delay device, circuit means for supplying the signal output from the output terminal of said first delay devices to each of four different unused input terminals of said sum pulse deriving means, circuit means for applying the signal output from the output terminal of said second delay device to two further unused input terminals of said sum pulse deriving means and circuit means for applying the signal output from the output terminal of said third delay device to a further unused input terminal of said sum pulse deriving means, said output terminal of said fourth amplitude discriminator circuit providing an output pulse signal train which is representative of the sum of the binary numbers represented by said simultaneously occurring input pulse signal trains.

17. An arrangement for effecting addition of binary numbers each represented by simultaneously occurring pulse signal trains which comprises a sum pulse deriving means having a plurality of separate input terminals for connection one to each of the sources of simultaneously occurring input signal trains and a single output terminal at which is provided a signal pulse whose amplitude is representative of the analogue sum of the number of "1" digit representing signals occurring simultaneously at said input terminals, a first amplitude discriminator circuit having an input terminal and an output terminal, circuit means supplying the signal output from the output terminal of said sum pulse deriving means to said input terminal of said first amplitude discriminator circuit, said first amplitude discriminator circuit providing an output signal pulse at said output terminal only when the amplitude of the signal pulse applied to said input terminal thereof exceeds the amplitude representative of fifteen simultaneous "1" digit representing signals, a second amplitude discriminator circuit having a first and second input terminals and an output terminal, circuit means for supplying the signal output from the output terminal of said sum pulse deriving means to said first input terminal of said second amplitude adding discriminator circuit, first gate circuit means having a first control signal terminal and input and output terminals, said output terminal being connected to said second input terminal of said amplitude discriminator circuit, a first source of subtraction signals representing sixteen "1" digit representing signals, circuit means connecting said input terminal of said first gate circuit means to said first subtraction signal source, said second amplitude discriminator circuit having a discrimination level whereby it provides an output signal pulse at its output terminal only when the resultant amplitude of the input signal applied to its input terminal less any subtraction signal applied to its second input terminal exceeds the amplitude representing seven "1" digit representing signals, a third amplitude discriminator circuit having a first, second and third input terminals and an output terminal, circuit means for supplying the signal output from said output terminal of said pulse sum deriving means to said first input terminal of said third amplitude discriminator, second gate circuit means having a second control signal terminal and input and output terminals, circuit means connecting said output terminal of said second gate circuit means to the second input terminal of said third amplitude discriminator circuit and for connecting said input terminal of said gate means to said first source of subtraction signals, third gate circuit means having a third control signal terminal and input and output terminals, a second source of subtraction signal representing eight "1" digit representing signals, circuit means connecting said output terminal of said third gate circuit means to said third input terminal of said third amplitude discriminator circuit and for connecting said input terminal of said third gate circuit means to said second source of subtraction signals, said third amplitude discriminator circuit having a discrimination level whereby it provides an output signal pulse at its output terminal only when the resultant amplitude of the input signal to its first input terminal less any subtraction signals applied to its second and third input terminals exceeds the amplitude representing three "1" digit representing signals, a fourth amplitude discriminator circuit having first, second, third and fourth input terminals and an output terminal, circuit means for supplying the output signal from the output terminal of said sum pulse deriving means to said input terminal of said fourth amplitude discriminator circuit, a fourth gate circuit means having a fourth control signal terminal and input and output terminals, means connecting said output terminal of said fourth gate circuit means to said second input terminal of said fourth amplitude discriminator circuit and for connecting said input terminal of said fourth gate means to said first source of subtraction signals, a fifth gate circuit means having a fifth control signal terminal and input and output terminals, means connecting said output terminal of said fifth gate circuit means to said third input terminal of said fourth amplitude discriminator circuit and for connecting said input terminal of said fifth gate circuit means to said second source of subtraction signals, a third source of subtraction signals representing four "1" digit representing signals, a sixth gate circuit means having a sixth control signal terminal and input and output terminals, means connecting said output terminal of said sixth gate circuit means to said fourth input terminal of said fourth amplitude discriminator circuit and for connecting said input terminal of said sixth gate circuit means to said third source of subtraction signals, said fourth amplitude discriminator circuit having a discrimination level whereby it provides an output signal pulse at its output terminal only when the resultant amplitude of the input signal to its first input terminal less any subtraction signals applied to its second, third and fourth input terminals exceeds the amplitude representing one "1" digit representing signal, a fifth amplitude discriminator circuit having first, second, third, fourth and fifth input terminals and an output terminal, circuit means for supplying the output signal from the output terminal of said sum pulse deriving circuit to said first input terminal of said fifth amplitude discriminator circuit, a seventh gate circuit means having a seventh control signal terminal and input and output terminal, means connecting said output terminal of said seventh gate circuit means to said second input terminal of said fifth amplitude discriminator circuit and for connecting said input terminal of said seventh gate circuit means to said first source of subtraction signals, an eighth gate circuit means having an eighth control signal terminal and input and output terminals, means connecting said output terminal of said eighth gate circuit means to said third input terminal of said fifth amplitude discriminator circuit and for connecting said input terminal of said eighth gate circuit means to said second source of subtraction signals, a ninth gate circuit means having a ninth control signal terminal and input and output terminals, means connecting said output terminal of said ninth gate circuit means to said fourth input terminal of said fifth amplitude discriminator circuit and for connecting said input terminal of said ninth gate circuit means to said third source of subtraction signals, a fourth source of subtraction signals representing two "1" digit representing signals, a tenth gate circuit having a tenth control signal terminal and input and output terminals, means connecting said output terminal of said tenth gate circuit means to said fifth input terminal of said fifth amplitude discriminator circuit and for connecting said input terminal of said tenth gate circuit means to said fourth source subtraction signals, said fifth amplitude discriminator circuit having a discrimination level whereby it provides an output pulse at its output terminal only when the resultant amplitude of the input signal to its first input terminal less any subtraction signals supplied to its second, third, fourth, and fifth input terminals exceeds the amplitude representing zero, "1" digit representing signal, first, second, third and fourth delay devices each having input and output terminals and each imposing a delay time equal to appropriate integral numbers of digit-intervals of said input pulse signal trains, circuit means connecting the output terminal of said first amplitude discriminator circuit to said first, second, fourth and seventh control signal terminals gate circuits and to the input terminal of said first delay device, circuit means connecting the output terminal of said second amplitude discriminator circuit to said third, fifth and eighth control signal terminals and to the input terminal of said second delay device, circuit means connecting the output terminal of said third amplitude discriminator circuit to said sixth and ninth control signal terminals and to said input terminal of said third delay device and circuit means connecting the output terminal of said fourth amplitude discriminator circuit to said tenth control signal terminal and to said input terminal of said fourth delay device and circuit means connecting the output terminals of each of said first, second, third and fourth delay devices to separate input terminals of said pulse amplitude adding means whereby said output terminal of said fifth amplitude discriminator circuit provides an electric pulse signal train representing in serial and dynamic form the binary sum of the numbers represented respectively by the pulse signal trains applied to said input terminals of said sum pulse deriving means.

18. An arrangement according to claim 17 wherein said sum pulse deriving means comprises a thermionic valve arranged in an anode-follower type circuit, a plurality of signal controlled switching means one for each of said input signal terminals, connection means between said input terminals and different related ones of said switching means for controlling such switching means by the pulse signals of said input pulse signal trains, said switching means each controlling the flow of a predetermined value of bleed current in the input circuit of said anode-follower type thermionic valve circuit.

19. An arrangement according to claim 18 wherein said switching means each comprise first and second diodes, the anode of said first diode being connected to the related input terminal and the anode of said second diode being connected to the input circuit of said anode-follower type thermionic valve circuit and the cathodes of said first and second diodes being interconnected and joined through a load resistance to a source of negative potential.

20. An arrangement according to claim 17 wherein each of said amplitude discriminator circuits comprise a thermionic valve arranged in an anode-follower type circuit, a source of bleed current for said anode follower type circuit and signal controlled switching means connected between said source of bleed current and said input of said anode follower type circuit, said switching means having their operating signal supplied through said input terminals of said amplitude discriminator circuit.

21. An arrangement according to claim 17 wherein said sum pulse deriving means comprises a first thermionic valve and a second thermionic valve, circuit means coupling said anode of said first thermionic valve to said control grid of said second thermionic valve, said coupling circuit means being traversable by direct current, a cathode load resistor for said second thermionic valve, circuit means providing a feed-back path traversable by direct-current between said cathode of said second thermionic valve and the control grid of said first thermionic valve, a plurality of pairs of diodes each having interconnected cathodes, one pair for each of said input terminals of said sum pulse deriving means, a source of negative potential, circuit means connecting the anode of one diode of each pair to a separate one of said input terminals, circuit means connecting the anodes of the second diode of each of said pairs to the control grid of said first thermionic valve and a plurality of common value resistors each connected one between the interconnected cathodes of each of said pairs of diodes and said source of negative potential.

22. An arrangement according to claim 17 wherein each of said amplitude discriminator circuits comprises a first thermionic valve, a second thermionic valve, circuit means traversable by direct current between said anode of said first thermionic valve and the control grid of said second thermionic valve, a resistance network in the cathode circuit of said second thermionic valve, said network comprising first, second and third resistors in series, means connected to the junction between said first and second resistances of said output terminal, a first diode having its cathode connected to the cathode of said second thermionic valve and its anode connected to the control grid of said first thermionic valve, a second diode having its anode connected to the junction between said second and third cathode network resistors and its cathode connected to the control grid of said first thermionic valve, circuit means including a series resistance connected between said control grid of said first thermionic valve and said first input terminal and further circuit means including a resistance of predetermined value connected between the control grid of said first thermionic valve and a source of negative potential.

References Cited in the file of this patent

UNITED STATES PATENTS

| | | |
|---|---|---|
| 2,401,779 | Swartzel | June 11, 1946 |
| 2,429,227 | Herbst | Oct. 21, 1947 |

OTHER REFERENCES

Progress Report (2) on the EDVAC, Moore School of E. E., Univ. of Pa., June 30, 1946, declassified Feb. 13, 1947; pages 1-1-24, 1-1-24A, 1-1-25, 1-1-25A and B, 1-1-26, 1-1-26A, 1-1-27, and 1-1-27A.

High Speed Computing Devices, Engineering Research Associates, 1950, pages 285 to 289, inclusive.